United States Patent [19]

Kobayashi

[11] Patent Number: 4,463,722
[45] Date of Patent: Aug. 7, 1984

[54] ENGINE KNOCK SENSOR

[75] Inventor: Tatsuo Kobayashi, Aichi, Japan

[73] Assignee: Toyota Jidosha Kabushiki Kaisha, Toyota, Japan

[21] Appl. No.: 476,337

[22] Filed: Mar. 17, 1983

[30] Foreign Application Priority Data

Oct. 5, 1982 [JP] Japan ................................. 57-174884

[51] Int. Cl.³ .............................................. F02P 5/10
[52] U.S. Cl. .................................... 123/425; 123/435
[58] Field of Search ............... 123/425, 437, 438, 440, 123/488, 585, 435; 364/801, 803, 806; 73/35, 115, 116, 117.3

[56] References Cited

U.S. PATENT DOCUMENTS

| | | | |
|---|---|---|---|
| 4,198,934 | 4/1980 | Carp et al. | 123/488 |
| 4,341,190 | 7/1982 | Ishikawa et al. | 123/440 |
| 4,343,278 | 8/1982 | Asano | 123/425 |
| 4,364,227 | 12/1982 | Toshida et al. | 123/440 |
| 4,383,512 | 5/1983 | Ishikawa et al. | 123/440 |
| 4,406,265 | 9/1983 | Brandt et al. | 123/425 |

Primary Examiner—Raymond A. Nelli
Attorney, Agent, or Firm—Kenyon & Kenyon

[57] ABSTRACT

An engine knock sensor for sensing knocking occurring in an internal combustion engine. The vibration in the engine, involving the vibration component caused by the knocking, is sensed by a vibration sensor. A feed back control is achieved by a closed loop constituted by a variable-gain amplifier the gain of which is controllable and adapted for amplifting the electric signal from the vibration sensor corresponding to the vibration, a mean level detecting circuit for calculating the mean value of the level of the amplified signal and outputting a mean level signal, and a gain controller for effecting a control of the gain of the variable-gain amplifier in accordance with the mean level signal so as to maintain the level of the amplified signal above a predetermined level. A predetermined voltage is added to the mean level signal to produce a reference signal which is compared by a comparator with the amplified signal from the variable-gain amplifier. A knocking signal is produced when the level of the amplified signal exceeds the level of the reference signal.

13 Claims, 6 Drawing Figures

ENGINE KNOCK SENSOR

BACKGROUND OF THE INVENTION

The present invention relates to an engine knock sensor for sensing knocking occurring in an internal combustion engine. More particularly, the invention is concerned with an engine knock sensor for use in an anti-knocking device which is adapted to perform such a control as to delay the ignition timing upon sensing a knocking occurring in an internal combustion engine.

A typical conventional knock sensor has a vibration pickup for detecting vibration in an internal combustion engine, a full wave rectifier for making a full wave rectification of the output from the vibration pickup, an integrator for obtaining the mean value of the output from the full wave rectifier through integration of the output, an adder for adding a predetermined voltage to the output from the integrator thereby to produce and output a judgement reference signal, and a comparator adapted for comparing the output from the vibration pickup with the judgement reference signal.

In this knock sensor, therefore, the electric signal directly derived from the vibration pickup is compared with the judgement reference signal which is obtained from the vibration pickup indirectly through the full wave rectifier, integrator and adder, and a knocking signal representing the occurrence of the knocking is generated when the level of the reference signal is exceeded by the level of the electric signal directly derived from the vibration pickup. The level V of the voltage of the judgement reference level is given by the following formula (1), $$V = K a_o + b_o \quad (1)$$

where, K represents a proportional constant, $a_o$ represents the level of electric signal and $b_o$ represents the level of the offset voltage which is added in the adder.

Figure 1:
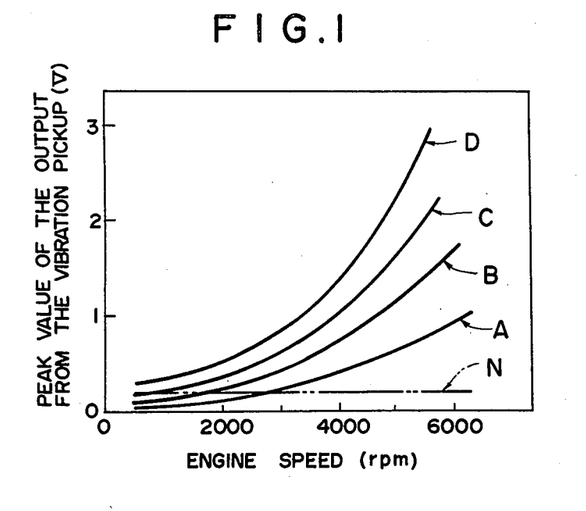
FIG. 1 is a diagram showing the relationship between the engine speed and the peak value of the output from the vibration pickup.

The peak value of the electric signal derived from the vibration pickup is increased in proportion to the increase of the engine speed and takes an extremely small level when the engine speed is low, as will be understood from FIG. 1. More specifically, in FIG. 1, a curve A shows the peak values of the output from the vibration pickup in relation to the engine speed as observed when there is no knocking taking place in the internal combustion engine, while curves B, C and D show the peak values as observed in the states of light, medium and heavy knocking taking place in the engine, respectively. Therefore, as an electric noise N, which is generated when the wiper is driven or when the headlight is put on, is picked up by, for example, the signal line between the vibration pickup and the full wave rectifier, the noise is superposed to the electric signal from the vibration pickup to make the electric output signal indistinguishable from the electric noise, particularly when the engine speed is low, resulting in a knock sensing failure or erroneous sensing of knocking occurring in the engine.

The erroneous sensing of knocking would be avoided if the judgement reference signal were selected to be sufficiently high as compared with the level of the electric noise. This, however, will impose a new problem of difficulty in the sensing of the engine knock of low level. It is also considerable to amplify the electric signal produced by the vibration pickup, in order to sense even the small level of engine knock. In such a case, however, the electric signal derived from the vibration pickup during medium- and high-speed operation of the engine will become excessively large to exceed the dynamic range of the engine knock sensor to make the sensing of the engine knock materially impossible particularly in the medium- and high-speed engine operation.

Another problem involved by the conventional engine knock sensor is that the engine knock sensor is required to have an impractically wide dynamic range in order to cover the entire range of engine operation including low-speed and high-speed engine operation, because the peak value of the electric signal derived from the vibration pickup is largely changed in response to a change in the engine speed.

SUMMARY OF THE INVENTION

Accordingly, it is a primary object of the invention to provide an engine knock sensor, improved to permit a highly accurate sensing of knocking over a wide range of engine operation including low-speed and high-speed regions, without necessitating any amplification of the dynamic range of the knock sensor while avoiding any unfavourable effect caused by electric noises, thereby to overcome the above-described problems of the prior art.

To this end, according to an aspect of the invention, a vibration sensor produces an electric signal corresponding to the vibration taking place in an internal combustion engine including vibration components caused by knocking occurring in the engine. A feed back control is effected by a closed circuit constituted by a variable-gain amplifier the gain of which is controllable and adapted to produce and output an amplified signal by amplifying the above-mentioned electric signal in accordance with the controlled gain, a mean level detection circuit adapted to produce and output a mean level signal by calculating the mean value of the amplified signal, and a gain controller adapted to control, in accordance with the mean level signal, the gain of the variable-gain amplifier to maintain the amplified signal at a level greater than a predetermined level. A reference signal is outputted from a reference signal generator by adding a predetermined voltage to the mean level signal. This reference signal is compared by a comparator with the amplified signal. A knocking signal representing the occurrence of knocking is produced when the level of the amplified signal is raised to exceed the level of the reference signal.

In the engine knock sensor of the invention summarized above, at least the the vibration sensor and the amplifier may be preferably made unitary with each other, in order to further prevent the picking up of electric noise by the signal lines connected to the vibration sensor. In a more preferred form of the invention, the amplifier, mean level detection circuit, gain controller, reference signal generator, comparator and the vibration sensor are constructed in one body, i.e. as a unit with one another. The constituents of the engine knock sensor of the invention may be shielded magnetically or electrically. It is possible to use, as the mean value detection circuit, a circuit having a series connection of a full wave rectifier circuit and an integration circuit. The gain controller may be constituted by a function generator or, alternatively, a series connection of an error detection circuit incorporated in an embodiment which will be explained later and a gain control circuit.

According to this arrangement, it is possible to maintain the level of the amplified signal derived from the amplifier at the same or higher level than the reference voltage, i.e. at the same or higher level than the electric noise, by a suitable control of the gain of the amplifier. It is, therefore, possible to detect any knocking in the engine over a wide range of engine operation covering low-speed and high-speed regions, however the level of the knocking may be low, without being influenced by the electric noise and without necessitating widening of the dynamic range of the engine knock sensor.

The above and other objects, features and advantages of the invention will become clear from the following description of the preferred embodiment taken in conjunction with the accompanying drawings.

DESCRIPTION OF THE PREFERRED EMBODIMENT

The invention will be described in more detail hereinunder with reference to the accompanying drawings.

Figure 2:
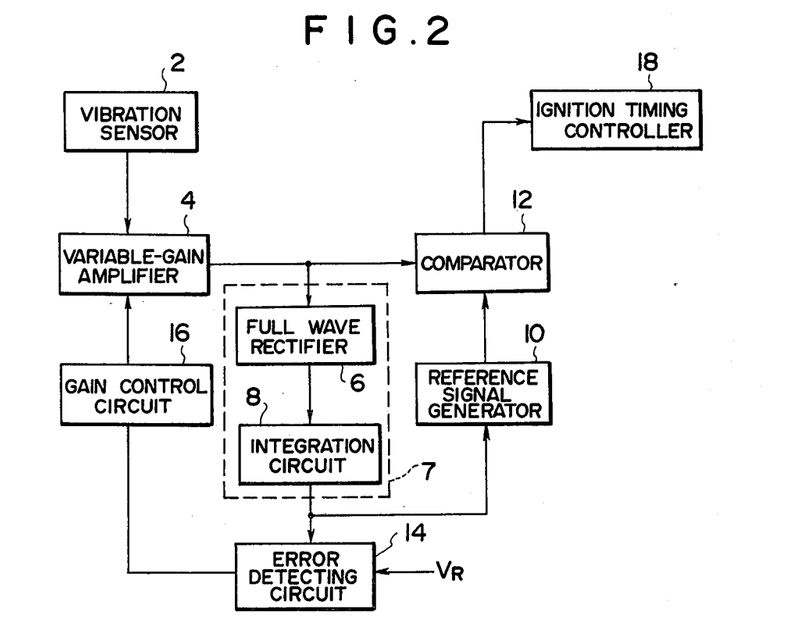
FIG. 2 is a block diagram of an engine knock sensor in accordance with an embodiment of the invention.

Referring first to FIG. 2 which is a basic block diagram of an engine knock sensor in accordance with an embodiment of the invention, a vibration sensor 2 constituted by, for example, a microphone is attached to the body of an internal combustion engine. The vibration sensor is adapted to convert the vibration of the engine into an electric signal. The vibration sensor 2 is connected at its output side directly to the input side of a variable-gain amplifier 4 the gain of which is controllable. The output of the variable-gain amplifier 4 is connected to one of the input terminals of the comparator 12 indirectly through a mean level detecting circuit 7 constituted by a full wave rectifier circuit 6 and an integration circuit 8 and through a reference signal generator 10 composed of an amplifier, an adder and so forth. In addition, the output of the variable-gain amplifier 4 is connected directly to the other input terminal of the comparator 12. The output of the integration circuit 8 is connected to the variable-gain amplifier 4 through an error detection circuit 14 and a gain control circuit 16 which in combination constitute a gain controller. The error detection circuit 14 receives a reference voltage of a level higher than that of the electric noise. The comparator 12 is connected at its output to an ignition timing controller 18 which is adapted to effect such a control as to advance the ignition timing when no knocking is taking place and to delay the ignition timing when knocking is taking place in the internal combustion engine.

Figure 3:
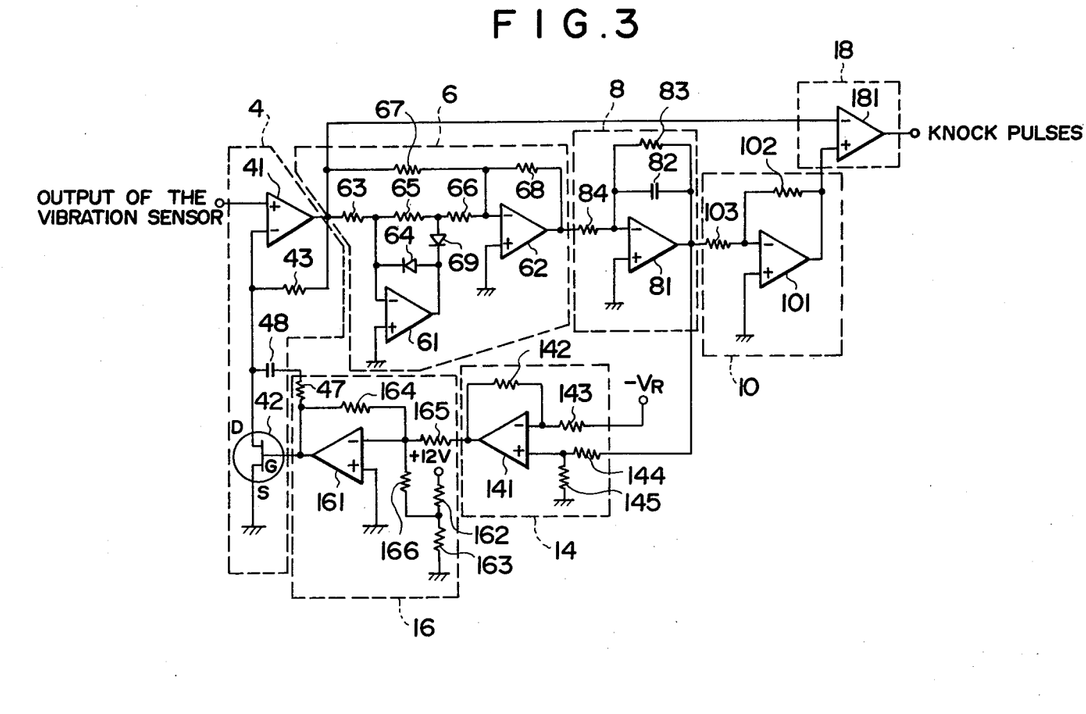
FIG. 3 is a circuit diagram of the embodiment shown in FIG. 2.

FIG. 3 shows a practical circuit arrangement of essential parts of this embodiment. The variable gain controller 4 is provided with an operation amplifier 41 and a field effect transistor 42. The aforementioned vibration sensor 2 is connected to the + (plus) terminal of the operation amplifier 41. The output of the operation amplifier 41 is connected to the full wave rectifier 6 and also to one of the input terminals of an operation amplifier 181 which constitutes a comparator 18. The output of the operation amplifier 41 is further connected to one of the input terminals of the same through a resistor 43 which has in this case a resistance value of 35. The gate of the field effect transistor 42 is connected in one hand to the gain control circuit 16 and on the other hand to the drain of the same through a resistor 47 and a capacitor 48. The source of the field effect transistor 42 is grounded while the drain of the same is connected to one of the input terminals of the operation amplifier 41.

The full wave rectifier circuit 6 includes an operation amplifier grounded at its + (plus) terminal and an operation amplifier 62 which is also grounded at its + (plus) terminal. One of the input terminal of the operation amplifier 61 is connected through a resistor 63 to the output of the operation amplifier 41 in the variable gain amplifier 4 and also to the output of the same operation amplifier 61 through a diode 64. One of the input terminals of the operation amplifier 62 is connected to the output of the operation amplifier 41 in the variable-gain amplifier 4 through resistors 63,65 and 66. A resistor 67 is connected to the above-mentioned input terminal of the operation amplifier 61 and the output of the operation amplifier 41, in parallel with the series connection of the resistors 63,65 and 66. The above-mentioned input terminal of the operation amplifier 62 is further connected to the output terminal of the same operation amplifier 62. The juncture between the resistor 65 and the resistor 66 is connected through a diode 69 to the output of the operation amplifier 61. The operation amplifier 62 is connected at its output to the integration circuit 8.

The integration circuit 8 has an operation amplifier 81 which is grounded at its + (plus) terminal. The output of the operation amplifier 81 is connected to the reference signal generator 10 and the error detecting circuit 14 and also to one of the input terminals of the same operation amplifier 81 through a capacitor 82 and a resistor 83 which are connected in parallel to each other. The output of the operation amplifier 62 in the full wave rectifier circuit 6 is connected through a resistor 84 to one of the input terminals of the operation amplifier 81. The integration time constant of the integration circuit 8 is determined by the resistor 84 and the capacitor 82. In order to determine the mean level, the integration circuit 8 has a comparatively long time constant which is, in this embodiment, 400 mS.

The reference signal generator 10 has an operation amplifier 101 which is grounded at its + (plus) terminal. The output of the operation amplifier 101 is connected to the + (plus) terminal of the operation amplifier 181 constituting the comparator 18, and also to one of the input terminals of the operation amplifier 101 through a resistor 102. The output of the operation amplifier 81 in the integration circuit 8 is connected to the input terminal of the operation amplifier 101 through a resistor 103.

The error detecting circuit 14 is provided with an operation amplifier 141 one terminal of which receives, through a resistor 143, a reference voltage $V_R$ of a level higher than the level of electric noise, e.g. 500 mV, after an inversion of the polarity. The output of the operation amplifier 141 is connected to the gain control circuit 16 and also to one of the input terminals of the same operation amplifier 141. Furthermore, the + (plus) terminal of the operation amplifier 141 is connected through a resistor 144 to the output of the operation amplifier 81 in the integration circuit 8 and is grounded through a resistor 145. The operation amplifier 141 thus forms a differential amplifier the gain of which in this case is selected to be 2 (two).

The gain control circuit 16 is composed of an operation amplifier 161 grounded at its + (plus) terminal and a potential dividing circuit composed of s series circuit of a resistor 162 and a resistor 163. The potential dividing circuit is connected at its one end to a power supply of, for example, 12V and grounded at the other side. The resistance values of the resistors 162 and 163 are selected to provide an offset voltage which is in this case 1.4V. The output of the operation amplifier 161 is connected to the gate of a field effect transistor 42 in the variable-gain amplifier 4 and also to one of the input terminals of the same operation amplifier 161 through a resistor 164. Furthermore, the output of the operation amplifier 141 in the error detecting circuit 14 is connected to the above-mentioned input terminal of the operation amplifier 161 through a resistor 165. The same input terminal of the operation amplifier 161 is further connected through a resistor 166 to the juncture between the resistor 162 and the resistor 163.

Figure 4:
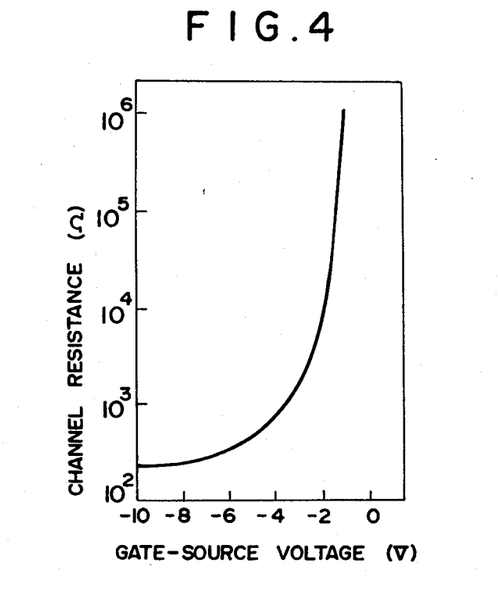
FIG. 4 is a diagram showing the relationship between the channel resistance and the voltage differential between gate and source of a transistor.

FIG. 4 shows an example of the relationship between the channel resistance and the gate-source voltage in the field effect transistor 42 which is, in this case, a field effect transistor manufactured and sold by SONY corporation under the commercial name of TX-429D.

Representing the resistance value of the resistor 43 of the variable-gain amplifier 4 by R, the gain G of the variable-gain amplifier 4 is expressed by the following formula (2).

$$G = 1(+R/Rc \tag{2}$$

where, Rc represents the channel resistance.

The engine knock ensor of this embodiment operates in a manner explained hereinunder. The vibration occurring in the body of the engine is sensed by the vibration sensor 2 which in turn produces and outputs an electric signal of an amplitude and frequency corresponding to those of the vibration. This electric signal is fed back to the variable-gain amplifier 4 through the variable-gain ampifier 4, full wave rectifier circuit 6, integration circuit 8, error detecting circuit 14 and the gain control circuit 16, thereby to control the gain of the variable-gain amplifier 4. The comparator 12 compares the output from the variable-gain amplifier 4 with the output from the reference signal generator 10, and produces knock pulses in accordance with the result of the comparison. This operation will be more fully described hereinunder with specific reference to FIG. 5.

Figure 5:
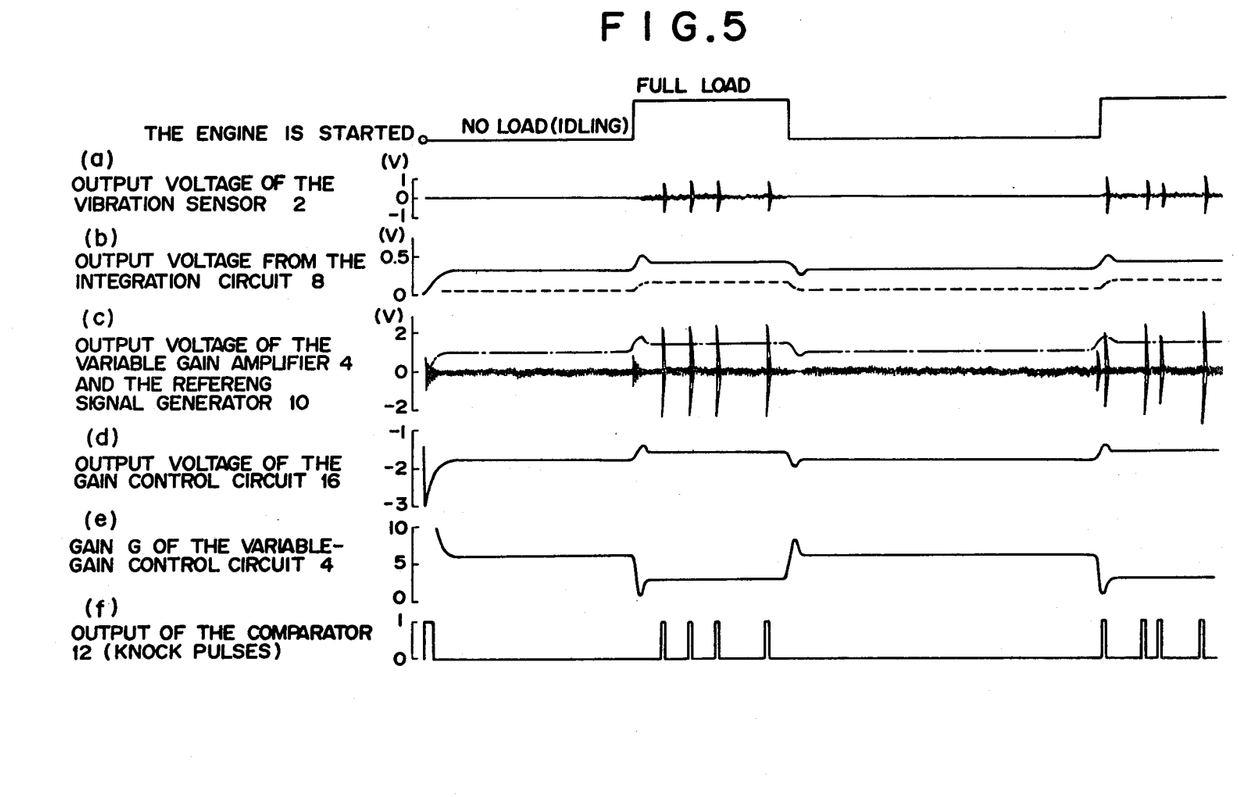
FIG. 5 is a diagram showing waveforms of signals available at essential parts of the engine knock sensor of the embodiment shown in the preceding Figures.

FIG. 5 shows the timing chart of the operation of this embodiment from the time of start up of the engine. The broken-line curve appearing in (b) in FIG. 5 shows the output voltage derived from the integration circuit 8 as obtained when the gain control is not effected or when the gain G of the variable-gain amplifier 4 is 2 (two), while the one-dot-and-dash line appearing in (c) of FIG. 5 shows the output voltage of the reference signal generator 10.

As the engine is started, the vibration sensor 2 produces an electric signal corresponding to the vibration of the engine. In the initial state, since the offset voltage of 1.4V is applied to provide a channel resistance Rc of 35K, the gain G of the variable-gain amplifier 4 is set to be 2 (two) in accordance with the formula (2) because the resistance value R is 35K. The integrator 8, therefore, produces an output voltage as shown by broken-line curve in the line (b) in FIG. 5. Then, the error detecting circuit 14 detects a voltage of about 1V which is a double of the difference between the output from the integrator 8 and the reference voltage which is 500 mV. Then, an offset voltage of 1.4V determined by the potential dividing circuit composed of the resistors 162 and 163 is added by the gain control circuit 16 so that a voltage shown at (d) in FIG. 5 is produced. Consequently, the gate voltage of the field effect transistor 42 is changed substantially to 2.4 V so that the channel resistance Rc takes a value of about 3.5K as seen from FIG. 4. As a result, the gain G of the variable-gain amplifier 4 in the next instant is changed substantially 10 (ten), so that the vibration of the engine is amplified to a level which is ten times as large as that of the original vibration. The integrator 8 has a comparatively long time constant of 400 mS, so that the output of the integrator 8 is not increased drastically but is raised gradually as shown by full line at (b) in FIG. 5. Meanwhile, the gain G of the variable-gain amplifier 4 is gradually decreased as shown at (e) in FIG. 5, in accordance with the increase in the output of the integrator 8, and is stabilized and balanced as the output from the integrator 8 is stabilized at a voltage which is smaller than 500 mV. The condition for attaining this balance is determined by the output value of the vibration sensor 2, integration time constant of the integrator 8 and the offset voltage of the gain control circuit 16 which determines the channel resistance Rc.

When the condition of engine operation is changed drastically from the no-load operation to the full-load operation in which the vibration sensor 2 produces a large output, the vibration of the engine is amplified largely in the period immediately after the abrupt change in the operating condition, because in such a period the gain G of the variable-gain controller 4 still remain at the level corresponding to the no-load operation of the engine. However, since output of the integrator 8 is not increased drastically, the gain G of the variable-gain amplifier 4 is changed gradually to stably settle the output of the integrator 8 at a voltage level below 500 mV which is the reference voltage and above the level at which the output from the integrator 8 is stably settled in the no-load operation of the engine. Thus, the output of the integrator 8 for determining the mean level of the output from the vibration sensor 2 is controlled and maintained above a substantially constant level.

The output from the integrator 8 thus obtained is amplified by the reference signal generator 10 so that the reference signal is obtained as shown by one-dot-and-dash line curve at (c) in FIG. 5. Then, the comparator 12 compares the output from the variable-gain amplifier 4 with the output from the reference signal generator 10, i.e. the reference signal, and knock pulses as shown at (f) in FIG. 5 are produced and outputted from the comparator 12 as at (f) in FIG. 5 when the level of the variable-gain amplifier 4 exceeds the reference signal.

These knock pulses are inputted to the ignition timing control circuit 18 having the delay circuit, in which a predetermined standard ignition timing signal is changed in accordance with the number of the knock pulses so as to control the igniter to delay the ignition timing optimumly.

Figure 6:
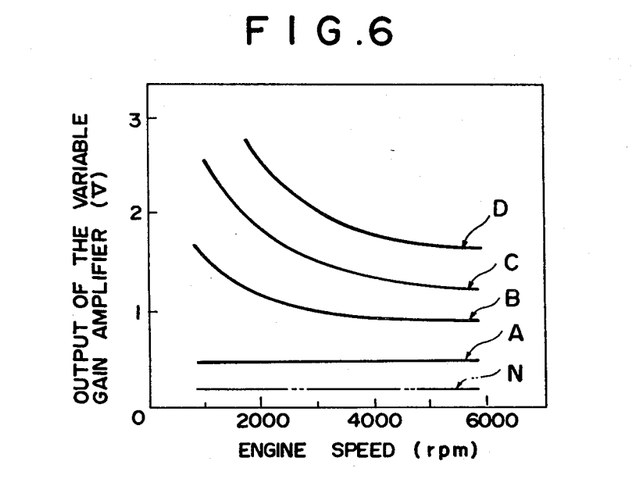
FIG. 6 is a diagram showing how the peak value of the output from a variable-gain amplifier is varied in accordance with the engine speed.

FIG. 6 shows the peak values of the outputs from the variable-gain controller in relation to the engine speed, for each of different levels of knocking occurring in the engine. In this Figure, symbols N,A,B,C and D repesent the electric noise and different levels of knocking same as those shown in FIG. 1.

Although the invention has been described through specific terms, the described embodiment is not exclusive and various changes and modifications may be imparted thereto without departing from the scope of the invention which is limited solely by the appended claims.

What is claimed is:

1. An engine knock sensor for sensing knocking occurring in an internal combustion engine comprising:
    a vibration sensor for sensing vibration in said engine and for producing an electric signal corresponding to the vibration in said engine, said vibration involving a vibration component caused by the knocking;
    a variable-gain amplifier the gain of which is controllable, for producing and outputting an amplified signal through an amplification of said electric signal in accordance with the controlled gain;
    a mean level detecting circuit for producing and outputting a mean level signal through determining the mean value of said amplified signal;
    a reference signal generator for producing and outputting a reference signal by adding a predetermined voltage to said mean level signal;
    a gain controller for controlling the gain of said variable-gain amplifier in accordance with said mean level signal so as to control and maintain said amplified signal at a level equal to or above a predetermined level; and
    a comparator for comparing said amplified signal with said reference signal and for producing knocking signal when the level of said amplified signal exceeds the level of said reference signal.

2. An engine knock sensor according to claim 1, wherein said gain controller includes a series circuit having an error detecting circuit and a gain control circuit which are connected in series to each other.

3. An engine knock sensor according to claim 1, wherein said mean level detecting circuit includes a series circuit having a full wave rectifier circuit and an integration circuit connected in series to each other.

4. An engine knock sensor according to claim 1, wherein said vibration sensor and said amplifier are constructed as a unit with each other.

5. An engine knock sensor according to claim 1, wherein said variable-gain amplifier, mean level detecting circuit, gain controller, reference signal generator, comparator and said vibration sensor are constructed as a unit.

6. An engine knock sensor according to claim 1, wherein said variable-gain amplifier, mean level detecting circuit, gain controller, reference signal generator, comparator and said vibration sensor are shielded electrically.

7. An engine knock sensor according to claim 1, wherein said variable-gain amplifier, mean level detecting circuit, gain controller, reference signal generator, comparator and said vibration sensor are shielded magnetically.

8. An engine knock sensor according to claim 1, wherein the constituents are connected through signal lines which are shielded electrically.

9. An engine knock sensor accordng to claim 1, wherein the constituents are connected through signal lines which are shielded magnetically.

10. An engine knock sensor according to claim 1, wherein said integration circuit has an integration time constant of about 400 mS.

11. An engine knock sensor according to claim 1, wherein said gain controller is adapted to produce an output which is obtained through comparing the output from said integrator with a reference voltage, multiplying the difference by a proportional constant and then adding an offset voltage to the product of the difference and the proportional constant.

12. An engine knock sensor according to claim 11, wherein said proportional constant is 2.

13. An engine knock sensor according to claim 11, wherein said offset vlaue is 1.4V.

* * * * *

UNITED STATES PATENT AND TRADEMARK OFFICE
CERTIFICATE OF CORRECTION

PATENT NO. : 4,463,722

DATED : August 7, 1984

INVENTOR(S) : Tatsuo Kobayashi

It is certified that error appears in the above-identified patent and that said Letters Patent is hereby corrected as shown below:

Column 5, line 42, after " G = 1" delete "(".

Signed and Sealed this

Twelfth Day of March 1985

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,463,722
DATED : August 7, 1984
INVENTOR(S) : Tatsuo Kobayashi

It is certified that error appears in the above-identified patent and that said Letters Patent is hereby corrected as shown below:

Column 3, line 57, change "directry" to --directly--.

Column 5, line 45, change "ensor" to --sensor--.

Column 5, line 52, change "ampifier" to --amplifier--.

Column 6, line 47, change "remain" to --remains--.

Signed and Sealed this

Twenty-fourth Day of September 1985

[SEAL]

Attest:

DONALD J. QUIGG

Attesting Officer

Commissioner of Patents and Trademarks—Designate